United States Patent [19]

Harada et al.

[11] Patent Number: 5,012,426

[45] Date of Patent: Apr. 30, 1991

[54] METHOD AND APPARATUS FOR CONTROLLING INJECTION COMPRESSION MOLDING

[75] Inventors: Susumu Harada; Hiroshi Kumazaki, both of Numazu, Japan

[73] Assignee: Toshiba Kikai Kabushiki Kaisha, Tokyo, Japan

[21] Appl. No.: 340,067

[22] Filed: Apr. 18, 1989

[30] Foreign Application Priority Data

Apr. 20, 1988 [JP] Japan ................................. 63-97196

[51] Int. Cl.$^5$ ........................ G06F 15/00; B29C 47/92
[52] U.S. Cl. .................................... 364/476; 364/473; 425/149
[58] Field of Search ........................ 364/476, 473, 477; 425/145, 149; 264/72, 40.5, 40.1; 164/155, 457, 157

[56] References Cited

U.S. PATENT DOCUMENTS

| | | | |
|---|---|---|---|
| 4,473,215 | 9/1984 | Rathfon, II et al. ............... | 264/40.1 |
| 4,674,053 | 6/1987 | Bannai et al. ...................... | 364/476 |
| 4,881,186 | 11/1989 | Tsuboi et al. ..................... | 364/565 |
| 4,889,667 | 12/1989 | Kojima et al. .................... | 264/40.1 |

*Primary Examiner*—Jerry Smith
*Assistant Examiner*—Paul Gordon
*Attorney, Agent, or Firm*—Cushman, Darby & Cushman

[57] ABSTRACT

In a method of controlling an injection compression molding of the type wherein resin is injected into a mold cavity while the metal molds are separated away a little, and thereafter the metal molds are clamped together, a pulsating mold clamping pressure is applied to the metal molds during compression. The apparatus for controlling injection compression molding comprises a mold clamping pressure setter for outputting a mold clamping signal, a pulse waveform setter for generating a pulse signal, a signal calculating unit connected to receive the mold clamping signal and the pulse signal for outputting a mold clamping control signal, a mold clamping device, and a valve responsive to the mold clamping control signal for controlling a pressurized operating fluid supplied to the mold clamping device.

6 Claims, 6 Drawing Sheets

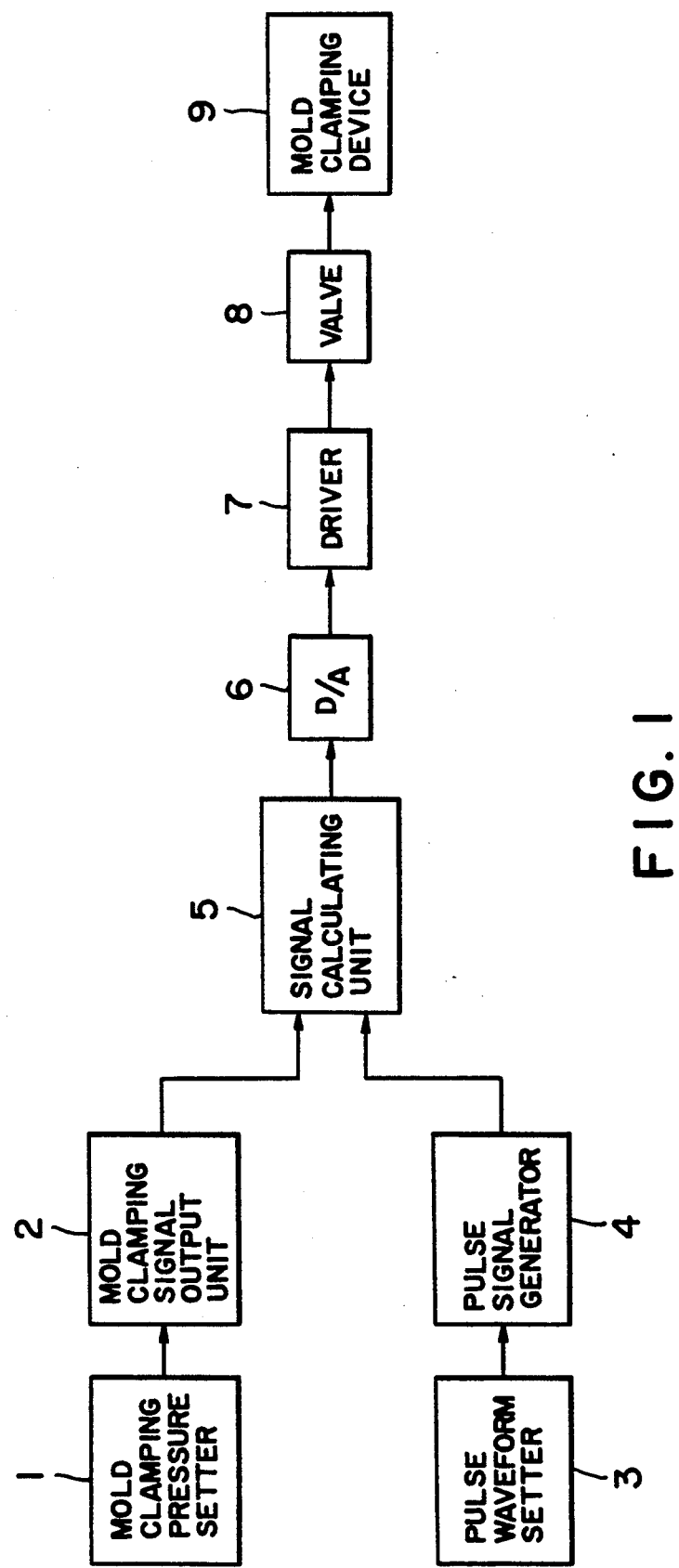
FIG. I

METHOD AND APPARATUS FOR CONTROLLING INJECTION COMPRESSION MOLDING

BACKGROUND OF THE INVENTION

This invention relates to a method and apparatus for controlling injection compression molding wherein thermoplastic resin is injected while metal molds are opened slightly and then the metal molds are clamped together, and more particularly a method and apparatus for controlling a mold clamping force or pressure.

In the art of plastic molding, it is necessary to minimize as far as possible the stress remaining in the molded product and to completely reproduce the complicated configuration of the mold cavity. In most cases, reproducibility is considered essential. This is also true in the art of injection compression molding.

When compared with a conventional injection molding wherein a hold pressure applied to a molten resin after it has been injected into a mold cavity, the injection compression molding is more advantageous in that generation of a stress especially at a portion near a gate is small so that the stress created in a molded product as a whole is small, but in a molding machine in which high pressure is stepwisely applied to the injected resin for improving the reproducibility, at portions of the molded product where the thickness thereof varies or at a boss of the product, generation of the stress is unavoidable. In an extreme case, the stress of the molded product as a whole becomes large, thus causing flexure of the product and decreasing the accuracy thereof.

For this reason, as shown in FIG. 12, it has been the practice to stepwisely or gradually decrease the mold clamping pressure (without any pulsation) as the molten resin injected into the mold cavity shrinks due to cooling and solidification of the molten resin.

With this method, however, the stress can be alleviated, since the mold clamping pressure is successively decreased without pulsation, transmission of the pressure is not sufficient thereby decreasing the reproducibility.

SUMMARY OF THE INVENTION

Accordingly it is an object of this invention to provide an improved method and apparatus for controlling injection compression molding capable of improving the reproducibility of an intricate mold cavity and decreasing the stress of the molded products.

Another object of this invention is to provide a novel method and apparatus capable of improving the reproducibility without the necessity of applying a high mold clamping pressure.

Still another object of this invention is to provide an improved method and apparatus capable of instantly transmitting the mold clamping pressure to all portions of a mold cavity, thus minimizing the stress created in a pressure transmitting passage.

A further object of this invention is to provide a novel method and apparatus capable of producing stress free molded products including such thick products as optical lenses, and such thin products as a laser disc and a compact disc.

According to one aspect of this invention there is provided a method of controlling an injection compression molding of the type wherein resin is injected into a mold cavity while metal molds defining the mold cavity are separated away a little, and thereafter the metal molds are clamped together, the method comprising the step of applying a pulsating mold clamping pressure to the metal mold during compression of injected resin.

According to another aspect of this invention there is provided apparatus for controlling compression molding comprising a mold clamping pressure setter, a mold clamping signal output unit for outputting a mold clamping signal in response to an output signal of the mold clamping pressure setter, a pulse waveform setter, a pulse signal generator, a pulse signal generator for generating a pulse signal in response to the output signal of the pulse waveform setter, a signal calculating unit connected to receive the mold clamping signal and the pulse signal for outputting a mold clamping control signal, a mold clamping device, and a valve responsive to the metal mold clamping control signal for controlling a pressurized operating fluid supplied to the mold clamping device.

In a preferred embodiment of this invention, the signal calculating unit comprises a central processing unit connected to a bus line, a timer, a ROM and a RAM which are connected to the bus line, input ports respectively connecting the mold clamping pressure setter and the pulse waveform setter to the bus line through respective input ports, and a digital analog converter connected to the bus line through an output port for applying the mold clamping control signal to the mold clamping device.

BRIEF DESCRIPTION OF THE DRAWINGS

In the accompanying drawings:

FIG. 1 is a block diagram showing a mold clamping device embodying the invention;

DESCRIPTION OF THE PREFERRED EMBODIMENTS

Figure 1A:
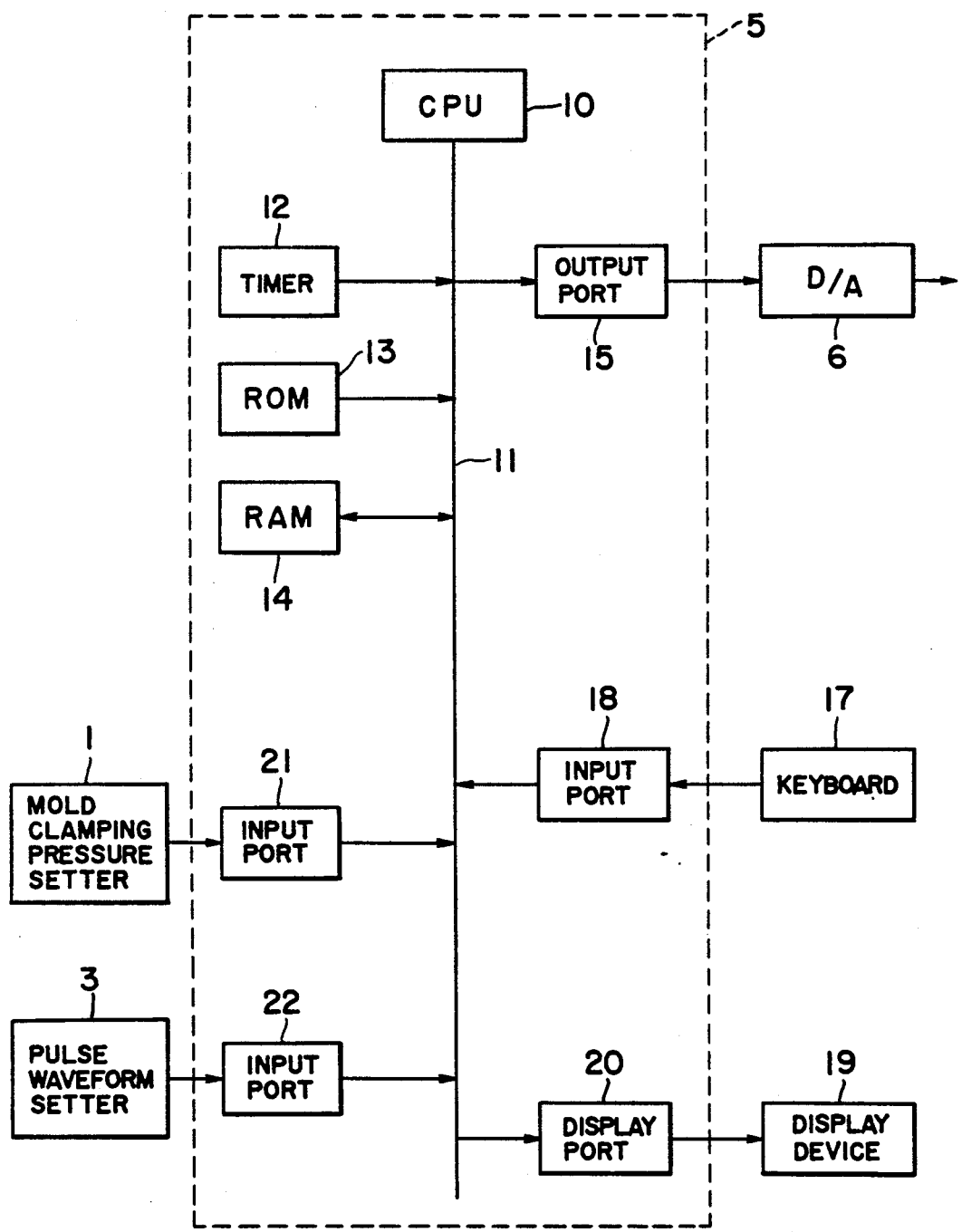
FIG. 1A is a block diagram showing the detail of the signal calculating unit 5 shown in FIG. 1.

The mold clamping device shown in FIG. 1 comprises a mold clamping pressure setter 1 setting a desired clamping pressure, and a mold clamping signal output unit 2 which sends a pressure signal to a signal calculating unit 5, the pressure signal being set in accordance with an interval elapsed after start of the mold clamping or a mold clamping position.

The mold clamping device further comprises a pulse waveform setter 3 in which a pulse waveform of the mold clamping pressure is set, and a pulse signal generator 4 which in response to the output signal of the pulse waveform setter 3 sends an output signal to signal calculating unit 5. As will be described later, in response to the output signals from mold clamping signal output unit 2 and pulse signal generator 4, the signal calculating unit 5 calculates a mold clamping control signal in accordance with an interval elapsed after start of the mold clamping or a mold clamping position, and the mold clamping control signal is applied to a mold clamping device through a D/A converter 6, a driver 7 and a valve 8 which controls pressurized oil supplied to the mold clamping device 9. The valve 8 supplies pulsating pressurized oil to the mold clamping device 9.

FIG. 1A shows the detail of the signal calculating unit 5. It comprises a central processing unit (CPU) 10, a bus line 11 connected to CPU 5, a timer 12 connected to bus line 11 for applying an interruption instruction to CPU 10 at a definite time, a ROM 13, that is a controlling program memory and a RAM 14 that is a controlling temporary memory, both connected to bus line 11, an output port 15 connected between bus line 11 and D/A converter 6, a keyboard 17 which is connected to bus line 11 through an input port 18 and a display device 19 connected to bus line 11 through a display port 20. The mold clamping pressure setter 1 and pulse generator 4 are connected to bus line 11 via input ports 21 and 22 respectively.

As above described, the apparatus shown in FIGS. 1 and 1A controls valve 8 such that it supplies pulsating pressurized oil to mold clamping device 9.

FIGS. 2 through 11 show various pulsating waveforms of the mold clamping pressure during an interval between an injection compression start time A and a clamping termination time B, in which the abscissa represents a time and the ordinate a mold clamping oil pressure.

Figure 2:
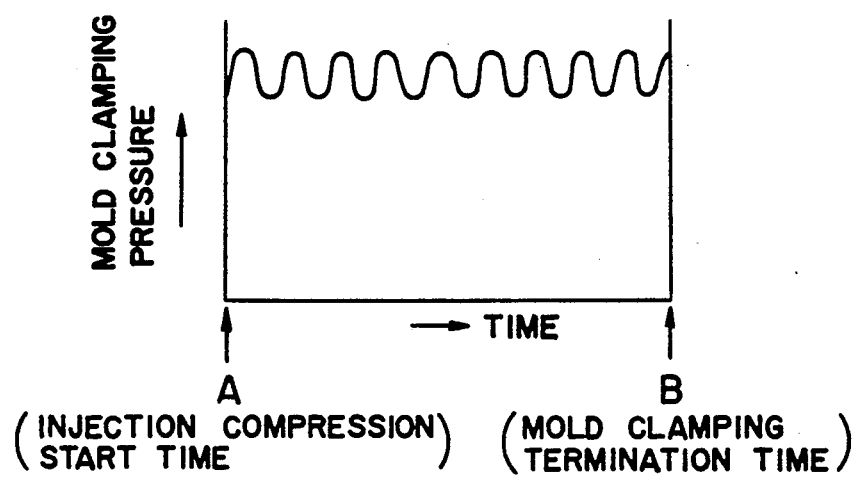
FIGS. 2 through 11 are graphs showing various pulsating waveforms of the mold clamping pressure from start of the injection compression to the termination thereof.

In the embodiment shown in FIG. 2 the amplitude and frequency of the pulsating clamping oil pressure are maintained constant during the mold clamping interval A-B.

Figure 3:
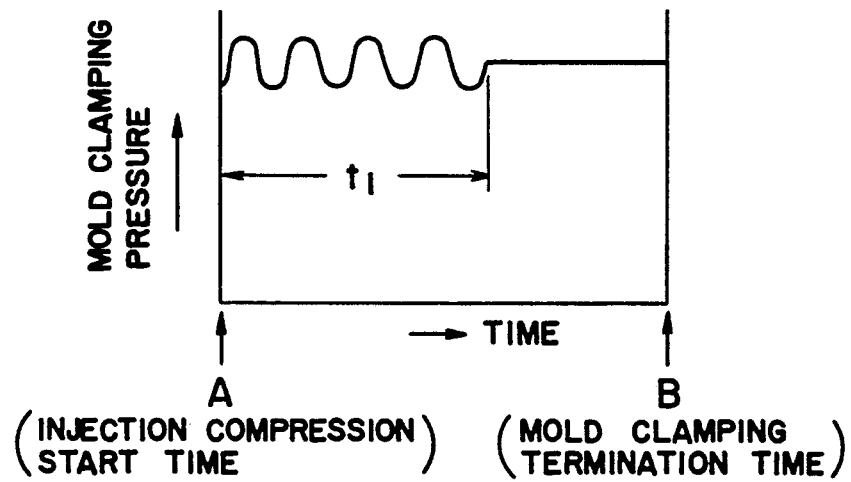

In the embodiment shown in FIG. 3 the frequency and amplitude of the pulsating clamping oil pressure are maintained constant during an interval $t_1$ after start time A, and after the interval $t_1$ the oil pressure is maintained at a constant value. With this modification, the pressure transmission caused by the pulsation is improved before the resin temperature decreases so as to improve the reproducibility with a relatively low pressure.

Figure 4:
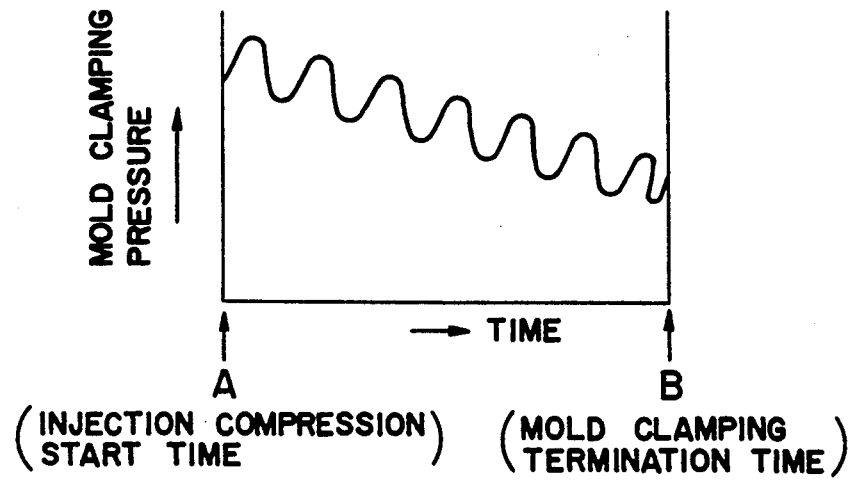

In the embodiment shown in FIG. 4, the peak value of the pulsating oil pressure is decreased with time so as to decrease the overall stress applied to the resin.

Figure 5:
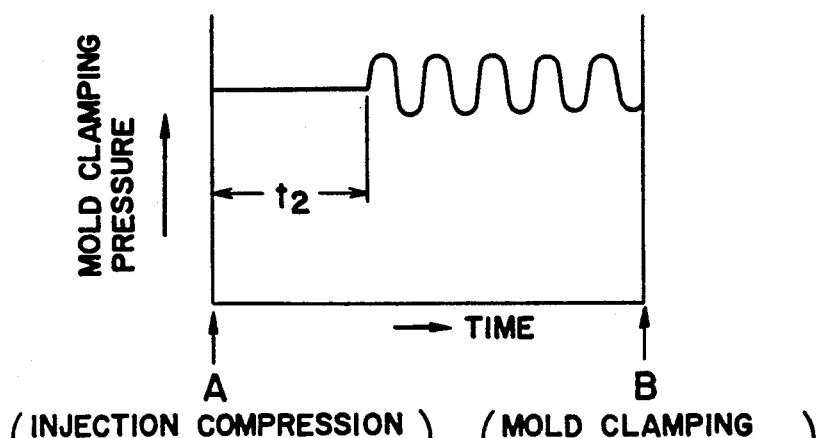

In the embodiment shown in FIG. 5, during an interval $t_2$ following the start time A, the oil pressure is maintained at a constant value and thereafter the oil pressure is pulsated just like the embodiment shown in FIG. 2. With this modified embodiment, during the interval $t_2$ determined by a timer (see FIG. 1A), a skin layer is formed about the resin injected into the mold cavity and the skin layer ensures an accurate reproduction of an intricated mold cavity. The timer is used for the purpose of delaying application of the pulsating mold clamping pressure because the skin layer is very thin so that it would be broken by the pulsating mold clamping pressure. In other words, application of the pulsating mold clamping pressure is delayed by the timer until the strength of the skin layer increases to withstand the pulsating mold clamping pressure.

Figure 6:
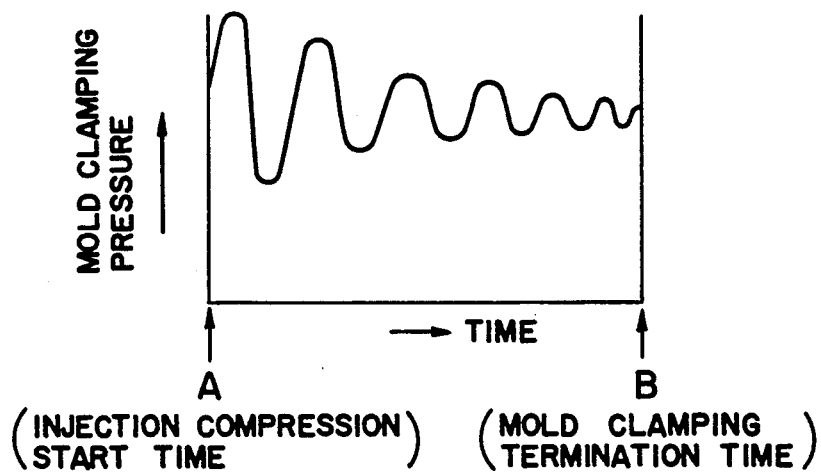

The embodiment shown in FIG. 6 shows a case wherein the thickness of the molded product is relatively large. By increasing the amplitude of the pulsating mold clamping pressure during the initial stage of the mold clamping, the plasticized resin can fill intricated configuration of the mold cavity, thus increasing the reproducibility. The amplitude of the pulsating mold clamping pressure is attenuated for coping with the variation in the solidification speed of the resin.

Figure 7:
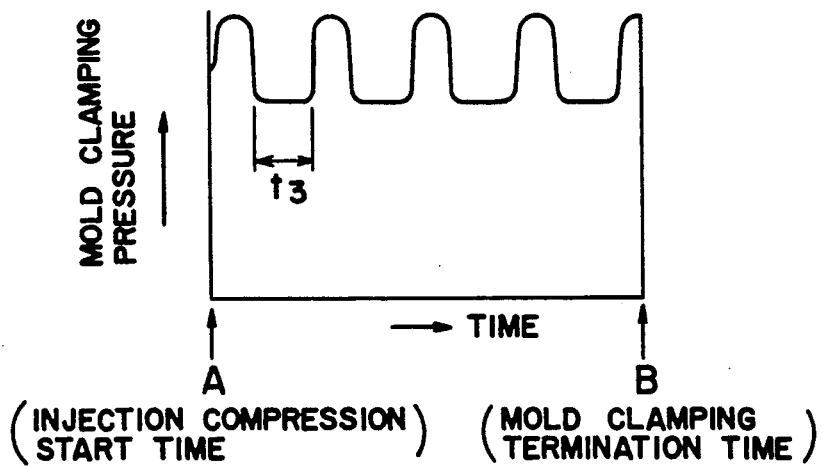

In the embodiment shown in FIG. 7, adjacent pulses of the pulsating mold clamping pressure is spaced apart by an interval $t_3$ larger than the pulse width because molded product having a relatively large thickness and where the heat conductivity of the molded product is not sufficiently high, the solidification speed is not high. This embodiment shows an example, in which a decrease in the reproducibility can be prevented without applying a pulsating mold clamping pressure having a constant frequency.

Figure 8:
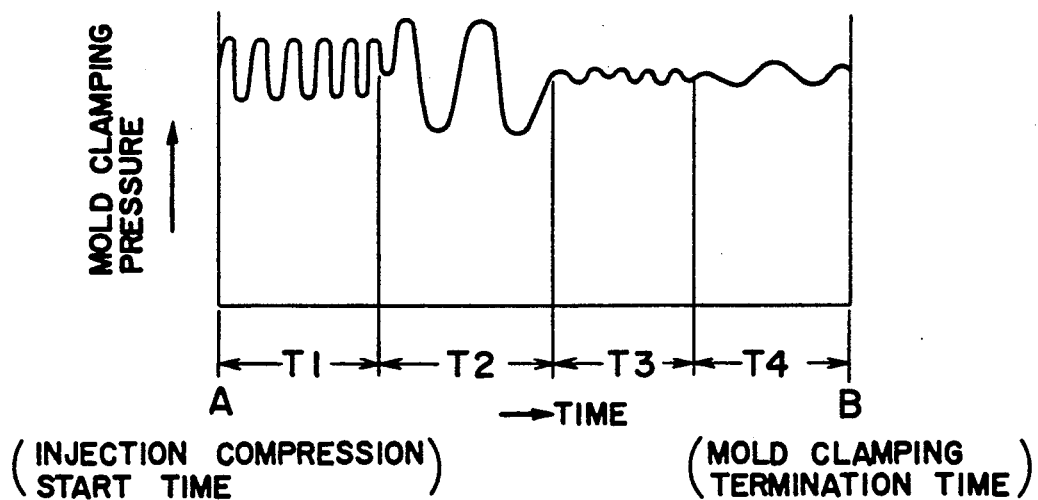

In the embodiment shown in FIG. 8, where the configuration of the molded product is complicated the thickness of the molded product varies from point to point so that it is necessary to change the method of applying the pulsating mold clamping pressure. According to this embodiment the compression time is divided into four intervals or sections $T_1 \sim T_4$. In the first section $T_1$ a frequency and amplitude of the pulsating mold clamping pressure are maintained constant for improving the reproducibility of relatively thin portions of the molded product. In the second section $T_2$, the amplitude of the pulsating mold clamping pressure is increased while the frequency thereof is decreased for improving the reproducibility of a molded product having a relatively large thickness. In the third and fourth sections $T_3$ and $T_4$ the amplitude of the pulsating mold clamping pressure is decreased in accordance with the speed of solidification of the injected resin.

Figure 9:
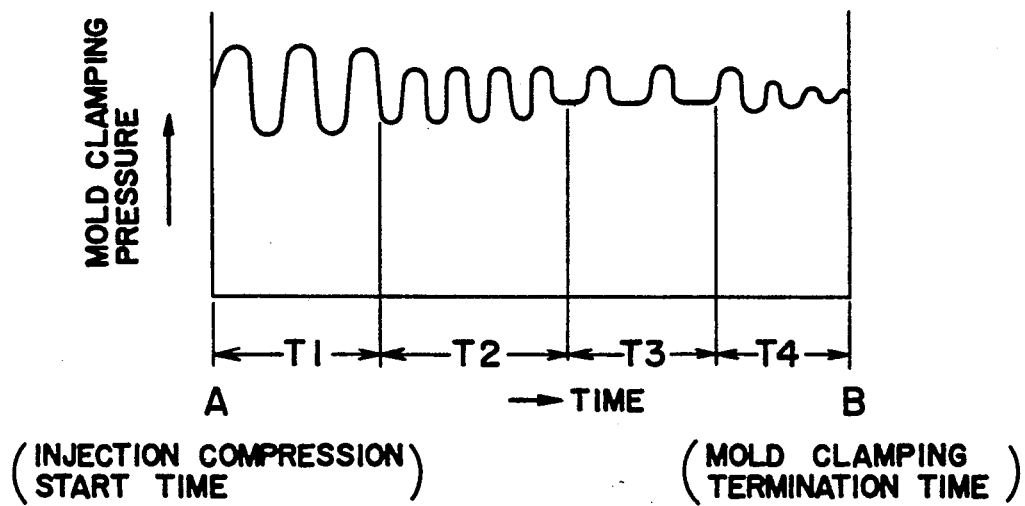

In the embodiment shown in FIG. 9, the purpose of varying the amplitude and frequency of the pulsating mold clamping pressure is substantially the same as that of the embodiment shown in FIG. 8.

Figure 10:
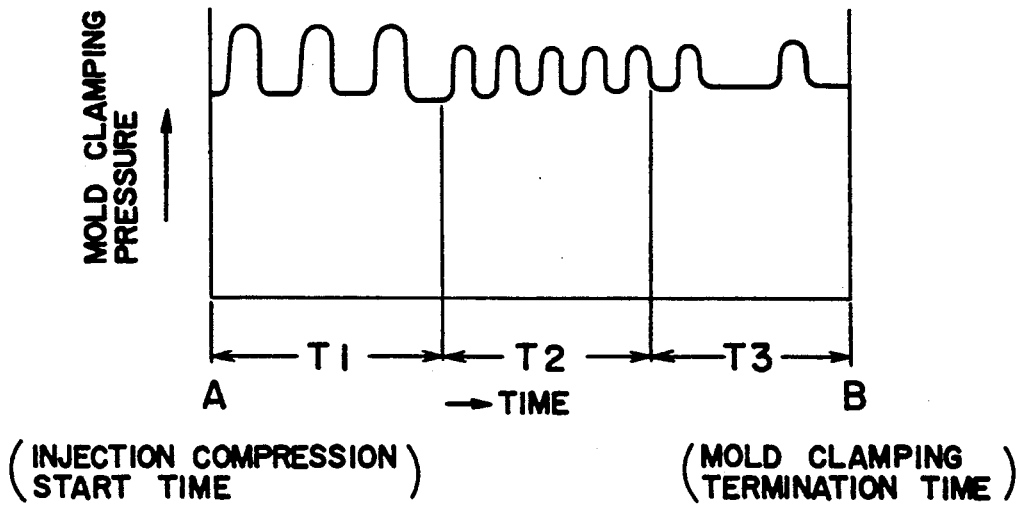

In FIG. 10, the amplitude and the frequency variations of the pulsating mold clamping pressure are similar to those shown in FIGS. 8 and 9, but the embodiment shown in FIG. 10 is different from those shown in FIGS. 8 and 9 in that this embodiment is suitable to obtain molded products having a relatively large thickness and a relatively small solidification speed.

Figure 11:
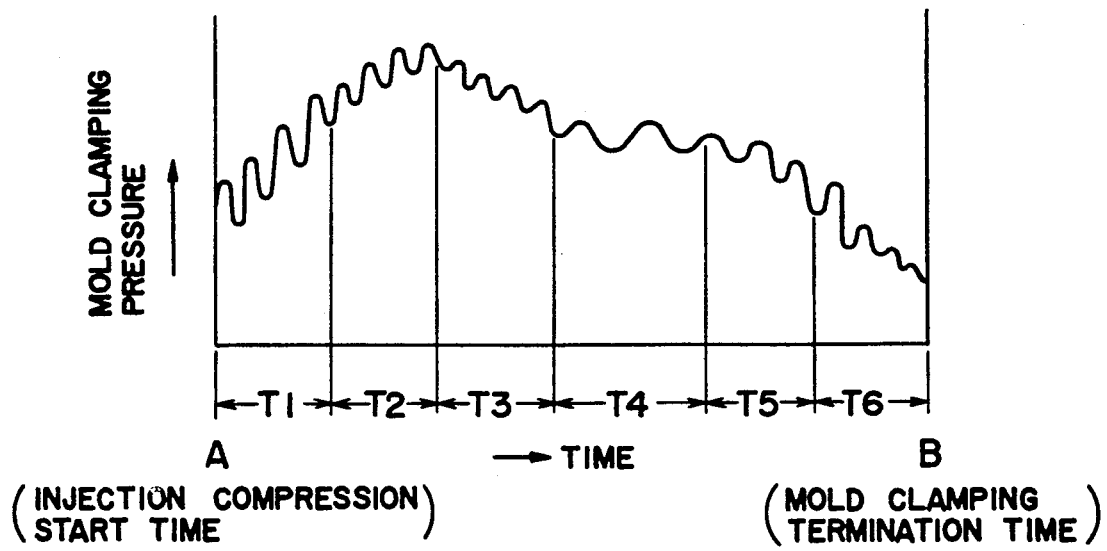
Figure 12:
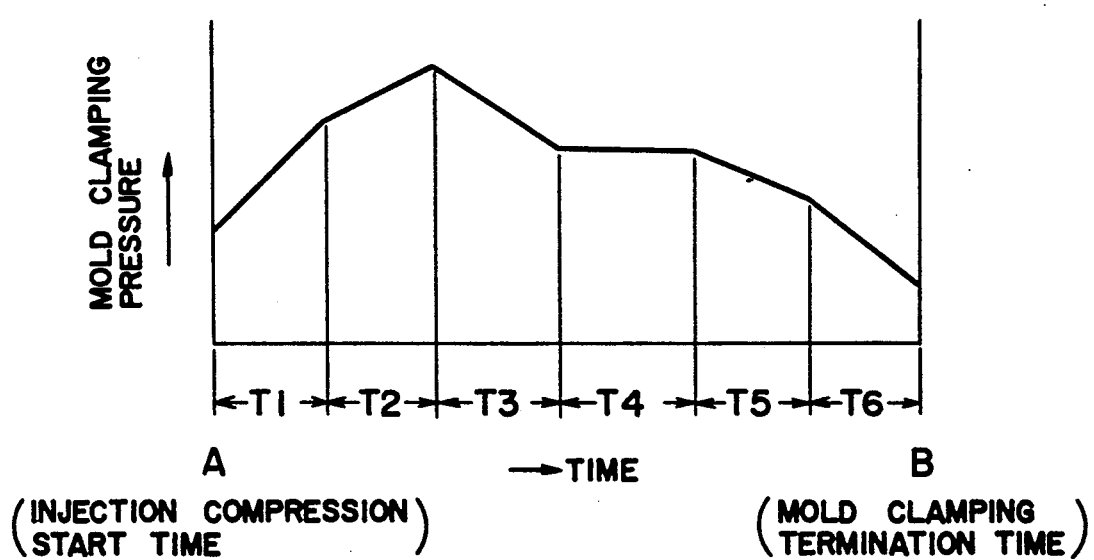
FIG. 12 is a graph showing a waveform of the mold clamping pressure according to a prior art method.

FIG. 11 shows an optimum embodiment suitable for effecting a programmed variation in the mold clamping pressure generally following a curve shown in FIG. 12 except that the mold clamping pressure pulsates. The start of the injection compression is not always initiated after completion of the injection step, but in certain cases injection compression is started during the injection step. FIG. 11 shows one example of such cases in which sections $T_1$ and $T_2$ correspond to the injection step. In these sections the injection operation is controlled such that the injected resin can reach and fill the terminal ends of an intricated mold cavity. In the following stages $T_3 \sim T_6$, the amplitude of the pulsating mold clamping pressure is gradually decreased and the frequency of the pulsating mold clamping pressure is decreased so as to improve the reproducibility of the molded product.

It should be understood that the instant invention is not limited to the specific embodiments described above and that many changes and modifications may be made without departing from the true spirit and scope of the subject invention as defined in the appended claims.

What is claimed is:

1. Apparatus for controlling injection compression molding comprising:
   a mold clamping pressure setter for setting the mold clamping pressure of said injection compression molding;
   a pulse waveform setter which sets a pressure waveform which varies a pressure set by said mold clamping setter in accordance with an interval after starting mold closing;
   a digital pulse signal generator for outputting the pressure set by said mold clamping pressure setter as an electric signal representing a pressure waveform;

a signal calculating unit for converting said electric signal into a signal commensurate with a preset pressure waveform;

a digital analog converter for converting said digital pulse signal into an analog signal; and driving means for driving a mold clamping device in response to said analog signal.

2. The apparatus according to claim 1 wherein said signal calculating unit comprises:

a central processing unit connected to a bus line;

a timer, a ROM and a RAM which are connected to said bus line; and input ports respectively connecting said mold clamping pressure setter and said pulse waveform setter to said bus line through respective input ports;

said central processing unit calculating frequency and amplitude of a pulsating metal mold clamping pressure;

said digital analog converter connected to said bus line of said signal calculating unit through an output port for supplying the mold clamping control signal to said mold clamping device.

3. The apparatus according to claim 2 wherein said central processing unit further comprises a keyboard which is connected to said bus line through an input port, and a display device connected to said bus line.

4. Apparatus for controlling injection compression molding comprising:

a mold clamping pressure setter for setting the mold clamping pressure of said injection compression molding;

a pulse waveform setter which sets a pressure waveform which varies a pressure set by said mold clamping setter in accordance with a mold closing position after starting mold closing;

a digital pulse signal generator for outputting the pressure set by said mold clamping pressure setter as an electric signal representing a pressure waveform;

a signal calculating unit for converting said electric signal into a signal commensurate with a preset pressure waveform;

a digital analog converter for converting said digital pulse signal into an analog signal; and driving means for driving a mold clamping device in response to said analog signal.

5. The apparatus according to claim 4 wherein said signal calculating unit comprises a central processing unit connected to a bus line;

a timer, a ROM and a RAM which are connected to said bus line; and input ports respectively connecting said mold clamping pressure setter and said pulse waveform setter to said bus line through respective input ports;

said central processing unit calculating frequency and amplitude of a pulsating metal mold clamping pressure;

said digital analog converter connected to said bus line of said signal calculating unit through an output port for supplying the mold clamping control signal to said mold clamping device.

6. The apparatus according to claim 5 wherein said central processing unit further comprises a keyboard which is connected to said bus line through a input port, and a display device connected to said bus line.

* * * * *